(No Model.)

H. R. OSBORN.
ARTIFICIAL BAIT.

No. 586,620. Patented July 20, 1897.

Witnesses:
H. B. Hallock.
S. I. Williamson.

Inventor:
Harmon R. Osborn.
By Geo. H. Holgate
Attorney.

UNITED STATES PATENT OFFICE.

HARMON R. OSBORN, OF GRANVILLE, NEW YORK.

ARTIFICIAL BAIT.

SPECIFICATION forming part of Letters Patent No. 586,620, dated July 20, 1897.

Application filed October 6, 1896. Serial No. 608,042. (No model.)

*To all whom it may concern:*

Be it known that I, HARMON R. OSBORN, a citizen of the United States, residing at Granville, in the county of Washington and State of New York, have invented a certain new and useful Improvement in Artificial Bait, of which the following is a specification.

My invention relates to a new and useful improvement in artificial bait for fishing purposes, and especially to that class known as "phantom" bait, and has for its object to provide a bait of this description which will overcome the objections heretofore attendant upon the use of this class of bait, such as the churning of the water by the rapid revolving of the bait proper, which to a large degree overcomes the alluring effect of the bait by confusing its appearance; and a further object of my improvement is to permit the weighting of the bait to various degrees and also to so conceal the hooks as to permit the bait to be used as a cast as well as a trolling-bait.

With these ends in view this invention consists in the details of construction and combination of elements hereinafter set forth, and then specifically designated by the claims.

In order that those skilled in the art to which this invention appertains may understand how to make and use the same, its construction and operation will now be described in detail, referring to the accompanying drawings, forming a part of this specification, in which—

Figure 1:
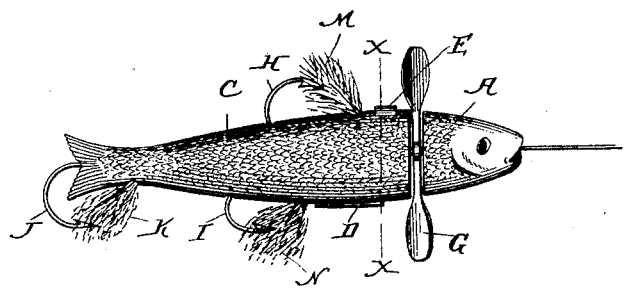
Figure 2:
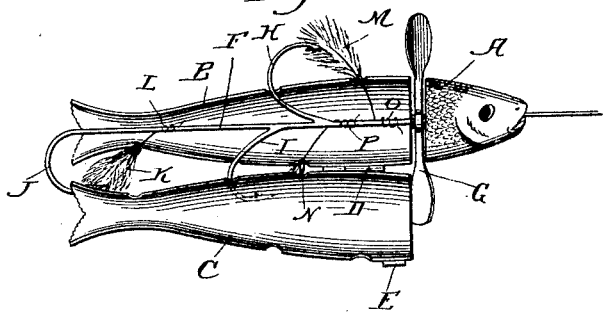
Figure 3:
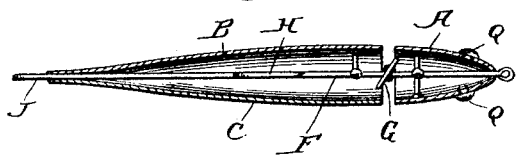
Figure 4:
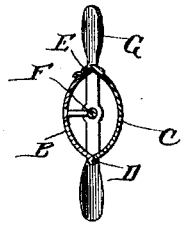

Figure 1 is an elevation of my improvement; Fig. 2, a similar view, the hinged section of the body being swung open so as to show the interior arrangement thereof; Fig. 3, a horizontal longitudinal section of the bait; Fig. 4, a section at the line *x x* of Fig. 1; and Fig. 5, a view similar to Fig. 1, showing a slightly-modified form of the bait in which the revolving fins are omitted.

In carrying out my invention as embodied in Figs. 1 to 4, inclusive, I form the bait in the general shape of a minnow or small fish and compose the same of three sections consisting of the head A, section B, and section C, the latter being hinged at D to the former section and held in place when closed by a spring-catch E, thus completing the body of the fish, between which and the head is left a space, as clearly shown, and the body and the head are held in their proper relative positions to each other by the central wire F. Upon this wire are journaled the revolving fins G, the outer portions of which are set at such angles as to cause them to revolve when the bait is drawn through the water or when the water flows past said bait with sufficient rapidity, but it is to be noted that the revolving of these fins will not revolve the fish, and therefore the bait will retain all of its alluring qualities, whether moving or standing, while the revolving fins will give to it the appearance of life and activity, since they are supposed to revolve at such a rate of speed as to preclude the possibility of a fish discerning the fact that they are revolving rather than going through the natural movements.

The wire F has formed therewith the hooks H, I, and J, the latter of which projects from the tail of the fish and has its point hid by a feather K, which is secured to the wire at L by passing through a small opening formed by two notches cut in the two sections of the body. The hooks H and I project from the upper and lower portions, respectively, of the fish through small openings therein, also formed by notches in the two sections of the body, and have their ends protected by the feathers M and N, respectively, the quills of which pass into the body through suitable notches in the two sections thereof and are secured to the central wire at O and P, as clearly seen in Fig. 2. By this arrangement the feathers or hooks may be changed at any time and others substituted therefor by simply swinging open the section C, which will give free access to the interior of the body, and also when it is desired to weight the body or change its weighting this is readily accomplished by the opening of the section C. As shown in Fig. 3, the eyes Q are so constructed that they may be attached to or detached from the bait, which will permit of the changing thereof to suit the fancy of the sportsman intending to use the same.

From this description the advantages of my improvement are obvious, among which is the fact that the bait remains in such a position in the water as to give it a natural appearance, while the moving of the fins will give it a most realistic appearance, and the feathers being so placed as to represent fins will at all times have a waving effect, while at the same time obscuring the points of the hooks.

Figure 5:
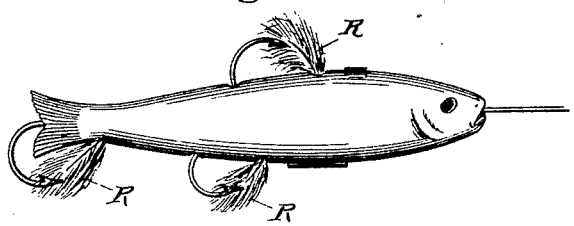

As shown in the modification in Fig. 5, the revolving fins may be omitted and the bait composed of two sections hinged together, so as to be opened, while the points of the hooks are protected by the feathers R, and when a bait is thus constructed it may be used for casting and be sufficiently alluring as to insure the catching of fish thereby.

I do not wish to be limited to any particular material for the construction of my improved bait, as it may be made of sheet metal, rubber, wood, or other suitable material without departing from the spirit of my invention.

Having thus fully described my invention, what I claim as new and useful is—

1. A bait of the character described, consisting of a body made in two sections, said sections being hinged together, a head secured to said body by a central wire, hooks projecting from said wire and through suitable openings in the body, and fins revolubly mounted upon the central wire between the body and the head, substantially as and for the purpose set forth.

2. In combination, a body composed of two sections hinged together, a central wire passing through said body, a head secured to one end of the wire, fins revolubly mounted upon the wire between the head and the body, hooks projecting through suitable openings in the body, and feathers so located as to obscure the ends of the hooks, substantially as and for the purpose set forth.

3. In a device of the character described, a body, a central wire passing therethrough, a head secured on the wire and fins revolubly mounted on the central wire between the head and body, as and for the purpose described.

4. In a device of the character described, a body formed in sections hinged together, a wire passing through the body, hooks on the wire passing through openings in the body and feathers secured to the wire and passing through openings in the body to hide the hooks, as and for the purpose described.

5. In a device of the character described, a body composed of two sections hinged together having notches formed on the meeting edges forming openings in the body, in combination with hooks secured within the body and passing out through the openings, as and for the purpose described.

6. In a device of the character described, a body composed of two sections hinged together having notches on their meeting edges forming openings in the body, a latch for locking said sections together, a central wire passing through the body, a hook formed on the rear end thereof, a head secured on the forward end, fins removably mounted on the central wire between the head and body, eyes removably secured in the head, hooks formed on the central wire passing through openings in the body and feathers secured on the central wire passing through said openings to hide the hooks from view, as and for the purpose described.

In testimony whereof I have hereunto affixed my signature in the presence of two subscribing witnesses.

HARMON R. OSBORN.

Witnesses:
S. S. WILLIAMSON,
W. D. TEMPLE.